United States Patent [19]

Airhart

[11] Patent Number: 4,471,963
[45] Date of Patent: Sep. 18, 1984

[54] SEALING MEMBER FOR ROTATING SHAFT AND METHOD OF SEALING THEREWITH

[75] Inventor: Gary T. Airhart, Charlotte, N.C.

[73] Assignee: Luwa Corporation, Charlotte, N.C.

[21] Appl. No.: 569,388

[22] Filed: Jan. 9, 1984

[51] Int. Cl.³ .................... F16J 15/16; F16J 15/40
[52] U.S. Cl. .................................... 277/1; 277/16; 277/22; 277/134
[58] Field of Search .................. 277/1, 16, 22, 134

[56] References Cited

U.S. PATENT DOCUMENTS

| | | |
|---|---|---|
| 1,448,079 | 3/1923 | Noeggerath . |
| 1,448,080 | 3/1923 | Noeggerath . |
| 1,682,842 | 9/1928 | Hamer . |
| 1,709,580 | 4/1929 | Jensen . |
| 1,733,416 | 10/1929 | Lebesnerois . |
| 1,770,496 | 7/1930 | Lawaczeck . |
| 1,873,267 | 8/1932 | Bigelow et al. ............. 277/22 |
| 2,038,299 | 4/1936 | Kohlhagen . |
| 2,131,927 | 10/1938 | Wenzel ................... 277/16 |
| 2,487,177 | 11/1949 | Pollock . |
| 3,131,940 | 5/1964 | Ertaud . |
| 3,131,942 | 5/1964 | Ertaud . |
| 3,331,101 | 7/1967 | Thomas .................. 277/134 |
| 3,355,179 | 11/1967 | McGrew ................ 277/134 |
| 3,368,799 | 2/1968 | Sluijters . |
| 3,622,164 | 11/1971 | Herbert ................. 277/134 |
| 3,700,247 | 10/1972 | Butler et al. . |
| 3,762,313 | 10/1973 | Schott, Jr. . |
| 3,913,925 | 10/1975 | Gyory ................... 277/134 |
| 3,940,150 | 2/1976 | Martin et al. ........... 277/134 |
| 3,973,779 | 8/1976 | Burgmann et al. . |
| 3,975,026 | 8/1976 | Boyle et al. ............ 277/134 |
| 4,010,960 | 3/1977 | Martin . |
| 4,084,825 | 4/1976 | Ludwig ................. 277/134 |
| 4,171,193 | 10/1979 | Rahlfs . |
| 4,334,687 | 6/1982 | Holzer ..................... 277/1 |

*Primary Examiner*—Robert I. Smith
*Attorney, Agent, or Firm*—Richards, Shefte & Pinckney

[57] ABSTRACT

An improved sealing sleeve for the rotating drive shaft of a gear pump or other fluid conveying system has an internal axial bore for receiving the shaft, an intermediate cavity formed in the bore and oppositely-handed helical channels extending in the bore on opposite sides of the cavity. The inward helical channels are of a hand relative to the shaft rotation for effectively pumping viscous fluid entering the annular spacing between the shaft and sleeve toward the cavity while the oppositely-handed outward helical channels effectively resist and overcome such pumped fluid flow, creating a static containment of the viscous fluid to produce a viscous seal about the shaft. Cooling fluid is conveyed through an annular passageway about the outward helical channels to solidify any viscous fluid entering the adjacent region of the outward channels to produce an outward essentially mechanical seal about the shaft.

18 Claims, 4 Drawing Figures

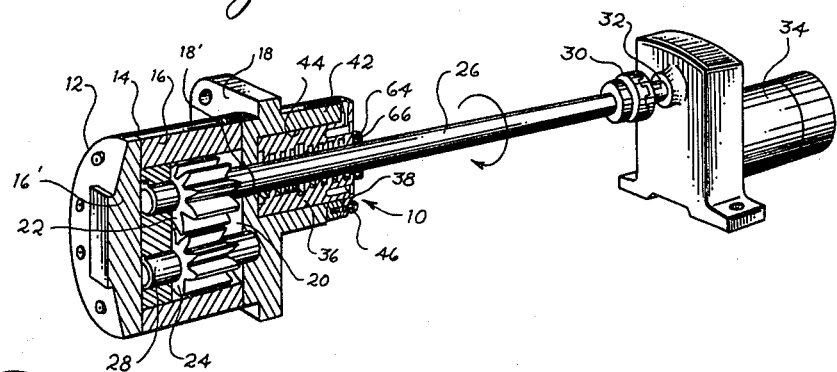
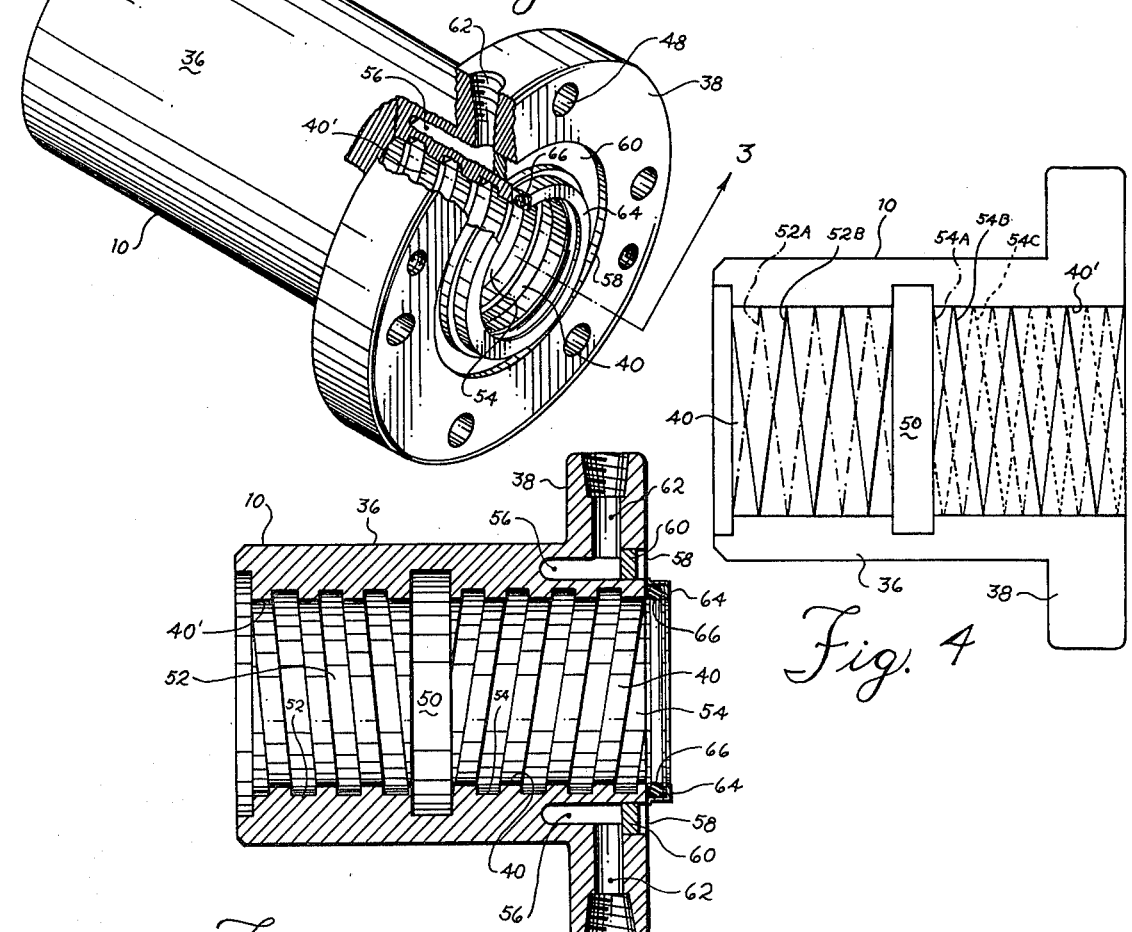

SEALING MEMBER FOR ROTATING SHAFT AND METHOD OF SEALING THEREWITH

BACKGROUND OF THE INVENTION

The present invention relates generally to apparatus and methods of sealing a rotating shaft in a fluid conveying system and more particularly to the sealing of the driving shaft of a conventional gear pump and like fluid conveying apparatus.

In any fluid conveying system and in substantially all fluid pumps, an engineering problem exists in the sealing of the rotating shaft to which the impeller is mounted at the location at which the shaft extends outwardly through a wall of the system separating its interior from the outside. This problem is particularly acute in pumps such as gear pumps which are operable at either or both very high internal pressures or at relatively low, vacuum-like internal pressures relative to the atmosphereic pressure of the ambient area. As is well known, gear pumps are essentially positive displacement pumps which have widely ranging applicability for many various fluid conveying uses and applications. For example, gear pumps have in recent years become increasingly utilized widely in the textile and similar fields for conveying polymeric and other similar viscous material from one process location, e.g. a reactor vessel such as a heat exchanger, to another process location, e.g. a downstream extruding system, and, in such varied applications, gear pumps may be operated either at relatively high or relatively low internal pressures depending upon the application. Conventionally, a gear pump basically includes a substantially enclosed housing in which a pair of meshing gear are mounted with the driving gear supported on a rotating shaft extending outwardly through the housing to be connected to the output shaft of a driving motor. In the past, a substantial problem has existed in providing an effective seal for the gear pump shaft which, on the one hand, would prevent leakage outwardly from the gear pump housing when operated under high internal pressures and, on the other hand, would prevent intake of ambient air when operated at vacuum or other relatively low internal pressures. The leakage of the conveyed working fluid is at best inefficient and costly and at worst renders the system effectively inoperable and may result in permanent damage to the gear pump. Similarly, the intake of ambient air at best produces air bubbles in the conveyed working fluid which ultimately results in an inferior product and at worst renders the system essentially inoperable.

In the past, packing material usually consisting of a graphite-impregnated cotton material has been squeezed about the gear pump shaft at the location it extends through its housing in order to seal it. Disadvantageously, such packing material produces substantial frictional contact between the material and the shaft which increases the required driving power for the system and produces excessive wear of the packing material necessitating its frequent replacement, all of which substantially increases the cost of the gear pump operation. In addition, the frictional forces created by the packing material have been known to cause wearing of the shaft ultimately requiring its replacement as well. Furthermore, such packing material is often relatively ineffective for its intended sealing purpose under conditions of substantial internal and external pressure differentials created in many conventional gear pump applications.

One proposed solution to the foregoing problems is set forth in Fox U.S. Pat. No. 4,336,213 wherein is disclosed a sealing sleeve mounted to the gear pump housing to receive its rotating shaft. The interior of the sealing sleeve is provided with a helical channel of a hand relative to the direction of rotation of the gear pump shaft to cause the working fluid entering the channel area about the shaft to be directed back into the housing and thereby, in theory, to seal the shaft effectively against fluid leakage in a frictionless, non-wearing manner.

However, in practice, the sealing sleeve of the Fox patent has been found to provide a generally ineffective seal in many ordinary gear pump applications. As will be understood, the internal helical channel of the sealing sleeve merely provides some resistance to outward flow of the working fluid about the shaft. In highly pressurized gear pump applications, the resistance provided by the sealing sleeve is insufficient to entirely prevent fluid leakage, particularly when the working fluid is of relatively low viscosity in which cases fluid leakage is sometimes so substantial that the gear pump cannot be effectively operated. On the other hand, in applications in which the gear pump is operated at low, vacuum-like internal pressures, the sealing sleeve is generally ineffective to preven air bubbles from being drawn into the gear pump housing through the channel area.

SUMMARY OF THE INVENTION

In contrast, the present invention provides a sealing member and method and a gear pump apparatus which represent substantial improvements of the apparatus and method of the above-noted Fox patent effective to provide a leak proof seal of a gear pump or other rotating shaft operable equally well under widely varying operating conditions and applications ranging from conditions of very high to very low internal operating pressures.

According to the present invention, an improved sealing sleeve is provided adapted to be secured to a wall of a fluid conveying system at the location at which a rotating shaft extends therethrough for receiving and sealing the shaft. The sleeve has a longitudinal bore therethrough of a diameter slightly greater than the shaft so that it extends through the bore without engagement with the sleeve. A cavity is formed annularly in the wall surface defining the bore intermediately along its length and a first helical channel arrangement is formed in such wall surface extending from the cavity to the end of the bore opening to the interior of the fluid conveying system, with a second helical channel arrangement of the opposite hand being formed in such wall surface extending from the cavity toward the outwardly opening end of the bore. The first helical channel arrangement is of a hand relative to the direction of rotation of the shaft for causing fluid material entering the channel arrangement from the interior of the fluid conveying system to be directed toward the cavity by the rotation of the shaft. The reverse hand of the second helical channel arrangement is effective to resist the fluid material from entering and flowing outwardly through the second channel arrangement. The sealing sleeve also includes a cooling arrangement annularly about the second helical channel arrangement at an outward spacing from the cavity for cooling the fluid material entering the adjacent portions of the second channel arrangement sufficiently to become solidified.

In the operation of the sealing sleeve, the opposed first and second helical channel arrangements and the cavity are effective to produce a relatively static viscous seal about the shaft by the viscous effect of the fluid material occupying the region of the channel arrangements and the cavity. In combination with this viscous seal, the cooling arrangement is effective to produce a soldified plug of the fluid material which provides an essentially mechanical seal about the shaft outwardly of the viscous seal. The viscous and mechanical seals thusly produced are together effective, on one hand, to prevent leakage of the fluid material outwardly from the system under forces of relatively higher pressure in the system and, on the other hand, to prevent admission of outside ambient air inwardly into the system under forces of relatively lower pressure in the system.

In the preferred embodiment of the present invention, the first and second helical channel arrangements of the sealing sleeve each include multiple helical channels, the second channel arrangement having a greater number of channels than the first channel arrangement. It is additionally preferred that the lead angle of the channels of the second arrangement is greater than the lead angle of the channels of the first channel arrangement and that the second channel arrangement is of a greater longitudinal extent than the first channel arrangement. In this manner, the channels of the second channel arrangement are effective to exert sufficient resistance to the outward flow of the fluid material in the region of the second channel arrangement to substantially overcome the material-conveying force of the channels of the first channel arrangement, thereby to resist flow of the fluid material outwardly past the cavity. The cooling arrangement preferably is a passageway formed through the sleeve annularly about the second channel arrangement to permit conveyance of a cooling fluid such as water through the passageway. A sealing ring may be affixed to the sleeve annularly about the bore at its outside end for sealing engagement with the shaft thereat to prevent outward leakage of low viscosity material during start-up of the conveying system.

The sealing sleeve and the sealing method performed thereby are preferably embodied and utilized in a conventional gear pump adapted for either metering or pressurizing melted polymeric plastic material. The gear pump basically includes an enclosed housing and a gear arrangement mounted in the housing on a rotatable shaft extending outwardly through an opening in the housing. In this embodiment, the sleeve is secured to the housing about the opening with the shaft extending through the sleeve for sealing it in the manner aforedescribed.

BRIEF DESCRIPTION OF THE DRAWINGS

FIG. 1 is a perspective view of a gear pump apparatus embodying the improved sealing sleeve and method of the present inventon;

FIG. 2 is a perspective view partially broken away of the improved sealing sleeve of FIG. 1;

FIG. 3 is an axial cross-sectional view of the sealing sleeve of FIG. 2 taken along line 3—3 thereof; and FIG. 4 is a schematic cross-sectional view of another embodiment of the sealing sleeve of the present invention.

DESCRIPTION OF THE PREFERRED EMBODIMENT

Referring now to the accompanying drawings and initially to FIG. 1, a sealing sleeve according to the present invention is indicated generally at 10 as preferably embodied in a gear pump 12 of an otherwise conventional construction. The gear pump 12 includes a substantially enclosed housing 14 having two mating front and back housing shells 16, only the rear shell 16 of which is shown, affixed together and to a mounting plate 18 to define an interior fluid working chamber 20. An inlet port (not shown) is provided in the rearwardly facing wall surface of the rear shell 16 and a corresponding outlet port (also not shown) is provided in the forwardly facing wall surface of the front shell for admission to and discharge from the chamber 20 of a fluid material to be conveyed. As embodied in a polymeric plastic conveying system, the inlet port of the gear pump 12 is connected in operative communication by conventional tubing or the like with the discharge port of a reactor vessel such as a heat exchanger or similar process apparatus to receive its output of melted viscous polymeric plastic material and the discharge port of the gear pump 12 is similarly connected in communication with a downstream process apparatus for conveying the melted plastic material thereto.

A pair of gears 22,24 are mounted in meshing engagement on two parallel shafts 26,28 rotatably journaled in the end wall 16' of the housing shells 16 and in the mounting plate 18. The shaft 26 is elongated to extend through an opening 18' in the support plate 18 to the outside of the housing 14 and is drivenly connected by a flexiblle coupling 30 to the output shaft 32 of a drive motor 34 to be driven thereby and in turn to drive shaft 28 through the meshing gears 22,24. The shafts 26,28 and their gears 22,24 rotate in a forward direction as indicated by the directional arrows in FIG. 1.

The sealing sleeve 10 is best seen in FIGS. 2 and 3 and includes a cylindrical body 36 with an annular flange 38 extending radially outwardly from one end of the body 36 and a cylindrical axial bore 40 formed therethrough. The sleeve 10 is preferably fabricated unitarily of stainless steel or another conventional non-corrosive material. The mounting plate 18 has a cylindrical hub 42 extending from its outward face about the opening 18' and having an enlarged interior cylindrical recess 44 coaxial with the opening 18'. The cylindrical body 36 of the sleeve 10 is sealably fitted in the enlarged recess 44 with the flange 38 abutting the hub 42 and with the shaft 26 extending through the axial bore 40 of the sleeve 10 and the sleeve 10 is secured in such disposition to the mounting plate 18 by bolts 46 extending into the hub 42 through openings 48 spaced about the flange 38 of the sleeve 10.

The axial bore 40 of the sleeve 10 is only slightly greater in diameter than the shaft 6 to provide as small a clearance therebetween without engagement of the shaft as conventional manufacturing tolerances permit thereby to avoid frictional contact between the sleeve 10 and the shaft 26. A relatively deep and wide annular cavity 50 is formed circumferentially in the interior wall surface 40' defining the bore 40 intermediately of its inward and outward ends and oppositely-turned, relatively shallow and narrow helical channels 52,54 open from the cavity 50 and extend respectively to open to the inward and outward ends of the sleeve 10. In one embodiment of the sleeve 10, a single channel 52 and a single channel 54, such as illustrated in FIG. 3, is provided. In other embodiments of the sleeve 10, there are provided multiple, identically spiralling channels and multiple, identically reversely spiralling channels 54, respectively started and terminating at spacings about the interior of the bore 40, commonly referred to as "multi-start" helices, as are illustrated schematically at 52A, 52B and 54A, 54B, 54C in FIG. 4. The channel or channels 52 are of a hand relative to the direction of the rotation of the shaft 26 to cause fluid entering the channel or channels 52 from the working chamber 20 to be effectively pumped in the channel or channels 52 toward the cavity 50 by the drag forces acting upon the fluid produced by the rotation of the shaft 26. The channel or channels 54 are of the opposite hand for urging the fluid entering the channel or channels 54 from the cavity 50 to be directed back toward the cavity 50 to effectively resist such fluid from flowing past the cavity 50 and from entering and flowing through the channel or channels 54 thereby to retard and overcome the pumped flow of the fluid entering the cavity 50 from the channel or channels 52.

To insure the provision of adequate resistance by the channel or channels 54 to retard and overcome the pumped fluid flow from the channel or channels 52, the channel or channels 54 are inclined at a greater lead helix angle than the channel or channels 52, and the cavity 50 is located closer to the inward end than the outward end of the bore 40 such that the axial length of the channel or channels 54 is greater than the axial length of the channel or channels 52. Furthermore, for the same purpose, there may be provided a greater number of individual channels 54, or as more commonly termed the number of "starts" of the channels 54, than the number of individual channels 52. As will be appreciated, the actual number and ratio of numbers of the channels 52,54 and their respective lead angles and axial lengths may all be varied in differing particular embodiments and applications of the sleeve 10 to suit the size of the sleeve 10, particularly the diameter of its axial bore 40, the viscosity of the fluid being handled by the gear pump 12 or other fluid conveying system, the temperature of the fluid, the speed of rotation of the shaft 26, and the internal pressure in the housing 14 or other system enclosure relative to the ambient atmospheric pressure, as well as many other variables which affect the flow characteristics of the working fluid channels 52,54, all as necessary to provide, on one hand, adequate pumping action on the fluid entering the channel or channels 52 and, on the other hand, sufficient resistance to fluid flow in the channel or channels 54. As a very general guideline, a greater number of channels 52,54 and a greater ratio of the number of channels 54 to the number of channels 52 are required as the diameter of the bore 40 of the sleeve 10 increase. Similarly, a greater ratio of the number of channels 54 to the number of channels 52 and a greater difference in their respective lead angles and axial lengths are normally required to compensate for any change in a factor of operation of the system which tends to facilitate a greater freedom of flow of the fluid, e.g., lower fluid viscosity, higher fluid temperature, greater rotational speed of the shaft 26 and greater internal system pressure. Conversely, in embodiments and applications of the sleeve 10 in the gear pump 12 or another fluid conveying system operating under vacuum-like conditions of lower internal pressure than the ambient atmospheric pressure, a lower ratio of the number of channels 54 to the number of channels 52 and a lower differential in their lead angles and axial lengths is ordinarily required. By way of example, in an embodiment of the sleeve 10 having a relatively small diameter bore 40 on the order of approximately 2.5 inches and an axial length of approximately 6 inches in a gear pump 12 used to pump meteringly under vacuum-like conditions a highly viscous polymeric plastic material, two channels 52A,52B are provided starting and terminating in the interior wall surface 40' of the bore 40 one hundred eighty degrees apart and three channels 54A, 54B,54C are provided starting and terminating in the interior wall surface 40' one hundred twenty degrees apart, the lead angle of the channels 52 is 6 degrees and the lead angle of the channels 54 is 9 degrees, and the channels 52 have an axial length of approximately 2.5 inches while the channels 54 have an axial length of approximately 2.8 inches, all as is schematically illustrated in FIG. 4.

The sleeve 10 also includes an annular passageway 56 extending circumferentially in the flange 38 adjacent the outward terminal end of the sleeve 10. The passageway 56 is formed by cutting an annular axially-extending slot in the outward face of the flange 38, preferably to a sufficient extent axially of the sleeve 10 to extend adjacent several turns of the channel or channels 54, the axial slot 58 being closed by a sealing ring 60 tightly press-fitted in the outward opening of the slot 58. Two bores 62 are formed at diametrically opposite sides of the flange 38 to extend radially outwardly from the passageway 56 through the flange 38 to open to the outside for connection to conventional tubing or the like in a separate fluid flow system for admitting cooling fluid, e.g., water, into the passageway 56 through one bore 62 and exhausting the cooling fluid from the passageway 56 through the other bore 62.

The operation of the sealing sleeve 10 as embodied in the gear pump 12 and their performance of the sealing method of the present invention will thus be understood. In the normal operation of the gear pump 12, the shaft 26 and its gear 22 are driven by the motor 34 and in turn drive the gear 24 and its shaft 28 to cause a viscous fluid such as molten polymeric plastic material received in the working chamber 20 through the inlet port of the gear pump 12 to be conveyed in the teeth of the gears 22,24 peripherally about the outward interior wall surfaces of the chamber 20 and to be discharge through the outlet port of the gear pump 12. As this operation progresses, some of the fluid in the chamber 20 will tend to enter the channel or channels 52 and the narrow annular spacing between the shaft 26 and the sleeve 10 thereat and, owing to the compatible hand of the helical channel or channels 52 with the rotation of the shaft 26, such fluid will be effectively pumped outwardly in the channel or channels 52 and in the annular spacing about the shaft 26 in their region toward the cavity 50 under the drag forces created by the rotation of the shaft 26 which act upon such fluid. The viscous fluid thusly directed to and occupying the cavity 50 is urged into the oppositely-handed channel or channels 54 under the continuing upstream pumping action in the region of the helical channel or channels 52. However, owing to the reverse hand of the channel or channels 54 and their greater lead angle, greater axial length, and in certain embodiments greater number, the channel or channels 54 act as an impediment to the outward flow of the viscous fluid from the cavity 50 and instead tend to urge the fluid to flow back toward the cavity 50 such that the channel or channels 54 resist and brake the fluid in the cavity 50 from entering and flowing through the channel or channels 54 sufficiently to substantially overcome the pumping action on the fluid in the region of the channel or channels 52. In this manner, the oppositely-turned helical channels 52,54 substantially counteract each other to effectively contain a relatively static quantity of the viscous fluid occupying in general equilibrium the channels 52,54, the cavity 50, and the annular spacing between the shaft 26 and the sleeve 10 from the inward end of the bore 40 opening to the working chamber 20 to a location outwardly of the cavity 50 in the region of the helical channel or channels 54. The viscous effect of the contained viscous fluid produces a substantially frictionless viscous seal about the shaft.

As the foregoing operation continues over some span of time, some tendency will exist that the relatively static viscous fluid forming the viscous seal will progress further outwardly in the channel or channels 54, this tendency and the speed at which it may occur depending upon various factors of the fluid and the system structure as aforementioned. During the operation of the gear pump 12, a cooling fluid, preferably water, is continuously cycled through the passageway 56. The cooling water is at a temperature sufficiently cooler than the viscous fluid to cool any working fluid in the region of the channel or channels 54 adjacent the passageway 56 sufficiently to solidify or "freeze" such fluid thereat. In this manner, a solidified plug is formed of any of the fluid tending to creep outwardly in the channel or channels 54 to the region adjacent the passageway 56 and effectively forms an essentially mechanical seal in direct sealing contact with the shaft 26. This solidified fluid plug acts in essentially the same manner as a conventional seal, but without the same frictional effects, to contain and prevent any of the working fluid from flowing outwardly past the plug area thereby to counteract any tendency in any application of the sleeve 10 of the particular viscous fluid to creep outwardly and ultimately leak to the outside of the gear pump 12 over time and also to prevent ambient air from entering the spacing between the shaft 26 and the sleeve 10 in the region of the channel or channels 54 and ultimately being drawn into the working chamber 20 of the gear pump 12.

As desired and necessary, a retaining flange 64 may be fixed to the outward face of the flange 38 of the sleeve 10 to hold a conventional sealing ring 66 annularly about the outward end of the axial bore 40 in sealing contact with the shaft 26. The sealing ring 66 will ordinarily not be necessary in most applications of the gear pump, particularly with highly viscous fluids which will not flow freely. However, the ring 66 is effective in applications wherein the working fluid is of a relatively low, highly flowable viscosity to contain such fluid entering the annular spacing between the shaft 26 and the sleeve 10 during the initial start-up of the system until the cooling fluid in the passageway 56 has had sufficient time to solidify the fluid in the adjacent region of the annular spacing to create the sealing plug. Additionally, the sealing ring 66 is effective to prevent leakage from the interior of the gear pump 12 during flushing or other cleaning operations.

The present invention provides significant advantages over conventional sealing members in providing an effective, substantially frictionless and non-wearing seal for the shaft 26 in applications of the gear pump 12 either under conditions of substantially higher internal pressures than the ambient atmospheric pressure for pressurized conveyance of the viscous fluid or under vacuum-like conditions of substantially lower internal pressures than the ambient atmospheric pressure for metered discharge of the viscous fluid. In all such applications, the effectiveness of the present sleeve 10 for utilizing the viscous fluid itself to produce in combination both an inward viscous seal about the shaft 26 and an outward mechanical-like seal thereabout effectively prevents leakage of the viscous fluid outwardly through the annular spacing between the shaft 26 and the sleeve 10 and prevents entrance of ambient air or any other ambient fluid inwardly through the annular spacing, all with relatively little frictional engagement of and wear on the shaft 26. Furthermore, the use of the vicous fluid itself to form the aforedescribed seal also prevents the contamination of the working fluid by foreign materials which in the past has been known to occur in conventional gear pump apparatus utilizing packing type seals and in applications in which gear pump apparatus is operated at low internal pressures. In contrast, conventional sealing sleeves of the type of the above-discussed Fox patent, in providing only a single helical channel of a hand resistive to shaft-induced fluid flow in the annular spacing about the shaft, have been found to be incapable of fully preventing outward leakage of viscous fluid, particularly fluid of low viscosity when operated under internally pressurized conditions and furthermore to be highly susceptible to the admission of ambient air when operating under vacuum-like conditions of low internal pressure. Conventional packing-type seals create damaging and costly frictional wear on the shaft which is even more disadvantageous.

While the sealing sleeve and method of the present invention have been described in regard to their preferred embodiment in an otherwise conventional gear pump application, the present invention will be understood by those persons skilled in the art to be of a substantially broader utility not limited to such gear pump applications but instead equally applicable in substantially any viscous fluid conveying system wherein a rotating shaft must be sealed at a location or locations at which it extends through a wall of the system separating its interior from the exterior. It is therefore to be understood that the foregoing disclosure of the specific preferred embodiment of the present invention is merely exemplary and has been made solely for purposes of illustration of the present invention and is not intended to limit the scope and substance of the present invention. All applications, adaptations, modifications, variations and other arrangements of the sleeve and method of the present invention that would be apparent from or reasonably suggested by the foregoing disclosure to those persons skilled in the art are considered to be within the scope and substance of the present invention which is to be limited only by the claims appended hereto and the equivilents thereof.

I claim:

1. A sealing member for sealing a rotating shaft in a viscous fluid conveying system at the location at which said shaft extends through a wall separating an interior area of said conveying system from an outside area, said member being adapted to be secured to said wall and comprising a longitudinal opening therethrough of a cross-sectional dimension slightly greater than said shaft for non-engaging extension of said shaft through said opening, a cavity formed annularly in the wall surface defining said opening intermediately along its length, first fluid directing means formed in said opening-defining wall surface between said cavity and the end of said opening which is to open to said interior area for causing viscous fluid entering from said interior area to be directed toward said cavity by the rotation of said shaft, second fluid directing means formed in said bore-defining wall surface between said cavity and the end of said bore which is to open toward said outside area for resisting viscous fluid from flowing past said cavity, and cooling means annularly about said second fluid directing means at an outward spacing from said cavity for causing viscous fluid entering the adjacent portions of said second channel means to be sufficiently cooled to be substantially solidified, said first and second fluid directing means and said cavity being effective for producing a relatively static viscous seal about said shaft by the viscous effect of said viscous fluid and said cooling means being effective for producing an essentially mechanical seal about said shaft by a solidified plug of said viscous fluid, said seals being effective for preventing leakage of said viscous fluid outwardly from said system under forces of relatively higher pressure in said system and for preventing entrance of outside ambient fluid inwardly into said system under forces of relatively lower pressure in said system.

2. A sealing member according to claim 1 and characterized further in that said first fluid directing means comprises first helical channel means extending from said cavity to the interior end of said opening and being of a hand relative to the rotation of said shaft for causing viscous fluid entering said first channel means to be directed toward said cavity by the rotation of said shaft, and said second fluid directing means comprises second helical channel means extending from said cavity a substantial portion of the axial length of said opening toward its outside end and being of a reverse hand to said first helical channel means for resisting viscous fluid from entering and flowing through said second helical channel means.

3. A sealing member according to claim 2 and characterized further in that the lead angle of said second helical channel means is greater than the lead angle of said first helical channel means for exerting sufficient resistance to outward flow of viscous fluid in said second channel means to substantially overcome the material-conveying force of said first channel means thereby to resist outward flow of viscous fluid past said cavity.

4. A sealing member according to claim 2 and characterized further in that each of said first and second helical channel means include multiple helical channels, said second channel means having a greater number of channels than said first channel means for exerting sufficient resistance to outward flow of said viscous fluid in said second channel means to substantially overcome the material-conveying force of said first channel means thereby to resist outward flow of viscous fluid past said cavity.

5. A sealing member according to claim 2 and characterized further in that said second channel means is of a greater longitudinal extent than said first channel means for exerting sufficient resistance to outward flow of viscous fluid in said second channel means to substantially overcome the material-conveying force of said first channel means thereby to resist outward flow of viscous fluid past said cavity.

6. A sealing member according to claim 1 and characterized further in that said cooling means comprises a passageway through said member annularly about said second channel means for conveyance of a cooling fluid through said passageway.

7. A sealing member according to claim 1 and characterized further by ring means affixed to said member annularly about said bore at the outside end thereof for sealing engagement with said shaft thereat for preventing outward leakage of low viscosity material during start-up of said conveying system.

8. A sealing sleeve for sealing a rotating shaft in a melted plastic conveying system at the location at which said shaft extends through an opening in a wall separating an interior area of said conveying system from an outside area, said sleeve being adapted to be secured to said wall about said opening thereof and comprising a longitudinal bore therethrough of a diameter slightly greater than said shaft for non-engaging extension of said shaft through said bore, a cavity formed annularly in the wall surface defining said bore intermediately along its length, first helical channel means formed in said bore-defining wall surface extending from said cavity to the end of said bore which is to open to said interior area and being of a hand relative to the rotation of said shaft for causing melted plastic material entering said first channel means to be directed toward said cavity by the rotation of said shaft, second helical channel means formed in said bore-defining wall surface from said cavity a substantial portion of the axial length of said bore toward its end which is to open toward said outside area and being of a reverse hand to said first helical channel means for resisting melted plastic material from entering and flowing through said second channel means, and a passageway through said sleeve annularly about said second channel means at an outward spacing from said cavity for conveyance of a cooling fluid through said passageway to cause melted plastic material entering the adjacent portions of said second channel means to be sufficiently cooled to be solidified, said first and second channel means and said cavity being effective for producing a relatively static viscous seal about said shaft by the viscous effect of said melted plastic material and said passageway being effective for producing an essentially mechanical seal about said shaft by a solidified plug of said plastic material, said seals being effective for preventing leakage of said melted plastic material outwardly from said system under forces of relatively higher pressure in said system and for preventing entrance of outside ambient fluid inwardly into said system under forces of relatively lower pressure in said system.

9. A sealing sleeve according to claim 8 and characterized further in that each of said first and second helical channel means include multiple helical channels, said second channel means having a greater number of channels than said first channel means, in that the lead angle of said channels of said second channel means is greater than the lead angle of said channels of said first channel means, and in that said second channel means is of a greater longitudinal extent than said first channel means, for exerting sufficient resistance to outward flow of said melted plastic material in said second channel means to substantially overcome the material conveying force of said first channel means thereby to resist outward flow of plastic material in said second channel means.

10. A sealing sleeve according to claim 1 and characterized further by ring means affixed to said sleeve annularly about said bore at the outside end thereof for sealing engagement with said shaft thereat for preventing outward leakage of low viscosity plastic material during start-up of said conveying system.

11. In combination with a gear pump adapted for metering or pressurizing melted plastic material and including an enclosed housing, and gear means mounted in the housing on a rotatable shaft extending outwardly through an opening in said housing, an improved sealing sleeve secured to said housing about said opening for sealing said shaft, said sleeve comprising a longitudinal bore therethrough of a diameter slightly greater than said shaft through which bore said shaft extends non-engagingly, a cavity formed annularly in the wall surface defining said bore intermediately along its length, first helical channel means formed in said bore-defining wall surface extending from said cavity to the end of said bore opening toward the interior of said housing and being of a hand relative to the rotation of said shaft for causing melted plastic material entering said first channel means to be directed toward said cavity by the rotation of said shaft, second helical channel means formed in said bore-defining wall surface extending from said cavity a substantial portion of the axial length of said bore toward its end opening toward the outside of said housing and being of a reverse hand to said first helical channel means for resisting melted plastic material from entering and flowing through said second channel means, and cooling annularly about said second channel means at an outward spacing from said cavity for causing melted plastic material entering the adjacent portions of said second channel means to be sufficiently cooled to be solidified, said first and second channel means and said cavity being effective for producing a relatively static viscous seal about said shaft by the viscous effect of said melted plastic material and said cooling means being effective for producing an essentially mechanical seal about said shaft by a solidified plug of said plastic material, said seals being effective preventing leakage of said melted plastic material outwardly from said housing under forces of relatively higher pressure in said housing and for preventing entrance of outside ambient fluid inwardly into said housing under forces of relatively lower pressure in said housing.

12. The improvement in a gear pump according to claim 11 and characterized further in that each of said first and second helical channel means include multiple helical channels, said second channel means having greater number of channels than saud first channel means, in that the lead angle of said channels of said second channel means is greater than the lead angle of said channels of said first channel means, and in that said second channel means is of a greater longitudinal extent than said first channel means, for exerting sufficient resistance to outward flow of said melted plastic material in said second channel means to substantially overcome the material conveying force of said first channel means thereby to resist outward flow of plastic material in said second channel means.

13. The improvement in a gear pump according to claim 12 and characterized further in that said cooling means includes a passageway through said sleeve annularly about said second channel means for conveyance of a cooling fluid through said passageway.

14. The improvement in a gear pump according to claim 11 and characterized further in that said cooling means includes a passageway through said sleeve annularly about said second channel means for conveyance of a cooling fluid through said passageway.

15. The improvement in a gear pump according to claim 11 and characterized further by ring means affixed to said sleeve annularly about said bore at the outside end thereof for sealing engagement with said shaft thereat for preventing outward leakage of low viscosity plastic material during start-up of said conveying system.

16. A method of sealing a rotating shaft in a viscous fluid conveying system at the location at which said shaft extends through a wall separating an interior area of said conveying system from an outside area, said method comprising closely confining said shaft non-engagingly along a longitudinal extent thereof at said wall, providing an annular enlargement in the confinement of said shaft intermediately of said longitudinal extent, causing viscous fluid entering the confined area about said shaft from said interior area to be directed toward said enlargement by the rotation of said shaft, resisting viscous fluid from flowing past said enlargement, and cooling the confined area annularly about said shaft at an outward spacing from said enlargement to cause viscous fluid entering the confined area thereat to be substantially solidified, thereby producing a relatively static viscous sealing about said shaft by the viscous effect of viscous fluid in the confined area about said shaft and producing an essentially mechanical sealing about said shaft by a solidified plug of viscous fluid at the location of said cooling in the confined area about said shaft, said sealings preventing leakage of viscous fluid outwardly from said system under forces of relatively higher pressure in said system and preventing entrance of outside ambient fluid inwardly into said system under forces of relatively lower pressure in said system.

17. A method of sealing a rotating shaft according to claim 16 and characterized further by providing a sealing sleeve secured to said wall and comprising a longitudinal bore therethrough of a diameter slightly greater than said shaft through which bore said shaft extends non-engagingly, a cavity formed annularly in the wall surface defining said bore intermediately along its length, first helical channel means formed in said bore-defining wall surface extending from said cavity to the end of said bore opening toward the interior of said housing and being of a hand relative to the rotation of said shaft for causing melted plastic material entering said first channel means to be directed toward said cavity by the rotation of said shaft, second helical channel means formed in said bore-defining wall surface extending from said cavity a substantial portion of the axial length of said bore toward its end opening toward the outside of said housing and being of a reverse hand to said first helical channel means for resisting melted plastic material from entering and flowing through said second channel means, and cooling means annularly about said second channel means at an outward spacing from said cavity for causing melted plastic material entering the adjacent portions of said channel means to be sufficiently cooled to be solidified.

18. In a method of conveying melted plastic material through a gear pump having an enclosed housing and gear means rotatably mounted in said housing on a rotating shaft extending outwardly through an opening in said housing, said method including delivering said melted plastic material to said gear pump and rotating said shaft to cause material-conveying rotation of said gear means, the improvement comprising sealing said shaft at said openig by providing a sealing sleeve secured to said housing about said opening said sealing having a longitudinal bore therethrough of a diameter slightly greter than said shaft through which said shaft extends non-engagingly, a cavity formed annularly in the wall surface defining said bore intermediately along its length, first helical channel means formed in said bore-defining wall surface extending from said cavity to the end of said bore opening to the interior of said housing, second helical channel means formed in said bore-definig wall surface extending from said cavity a substantial portion of the axial length of said bore toward its end opening toward the outside of said housing and being of a reverse hand to said first helical channel means, and a passageway through said sleeve annularly about said second channel means at an outward spacing from said cavity, rotating said shaft in a direction relative to the hand of said first channel means of said sleeve to cause plastic material entering said first channel means to be directed toward said cavity by the rotaton of said shaft and to cause the second channel means to resist plastic material from entering and flowing therethrough, and conveying a cooling fluid through said passageway to cause plastic material entering the adjacent portions of said second channel means to be sufficiently cooled to be solidified, thereby producing a relatively static viscous sealing about said shaft by the viscous effect of plastic material in said first and second helical channel means and said cavity and producing an essentially mechanical sealing about said shaft by a solidified plug of plastic material in said second helical channel means at said passageway, said sealings preventing leakage of plastic material outwardly from said housing under forces of relatively higher pressure therein and preventing entrance of outside ambient fluid inwardly into said housing under forces of relatively lower pressure therein.

* * * * *

UNITED STATES PATENT OFFICE
CERTIFICATE OF CORRECTION

Patent No. 4,471,963                              Dated   September 18, 1984

Inventor(s)       Gary T. Airhart

It is certified that error appears in the above-identified patent and that said Letters Patent are hereby corrected as shown below:

Column 1, Line 35, delete "gear" and insert therefor — gears — .
Column 2, Line 20, delete "preven" and insert therefor — prevent — .
Column 4, Line 34, delete "flexiblle" and insert therefor — flexible — .
Column 5, Line 47, after "fluid" insert — in the — .
Column 6, Line 46, delete "discharge" and insert therefor — discharged — .
Column 8, Line 14, delete "vicous" and insert therefor — viscous — .
Column 10, Line 27, after "surface" insert — extending — .
Column 11, Line 27, after "cooling" insert — means — .
Column 11, Line 48, delete "saud" and insert therefor — said — .
Column 13, Line 3, delete "greter" and insert therefor — greater — .
Column 13, Line 10, delete "definig" and insert therefor — defining — .
Column 13, Line 19, delete "rotaton" and insert therefor — rotation — .

Signed and Sealed this

Fourth  Day of  March 1986

[SEAL]

Attest:

DONALD J. QUIGG

Attesting Officer        Commissioner of Patents and Trademarks